(No Model.)
J. T. WEBB.
WEED TURNER.
No. 366,543. Patented July 12, 1887.
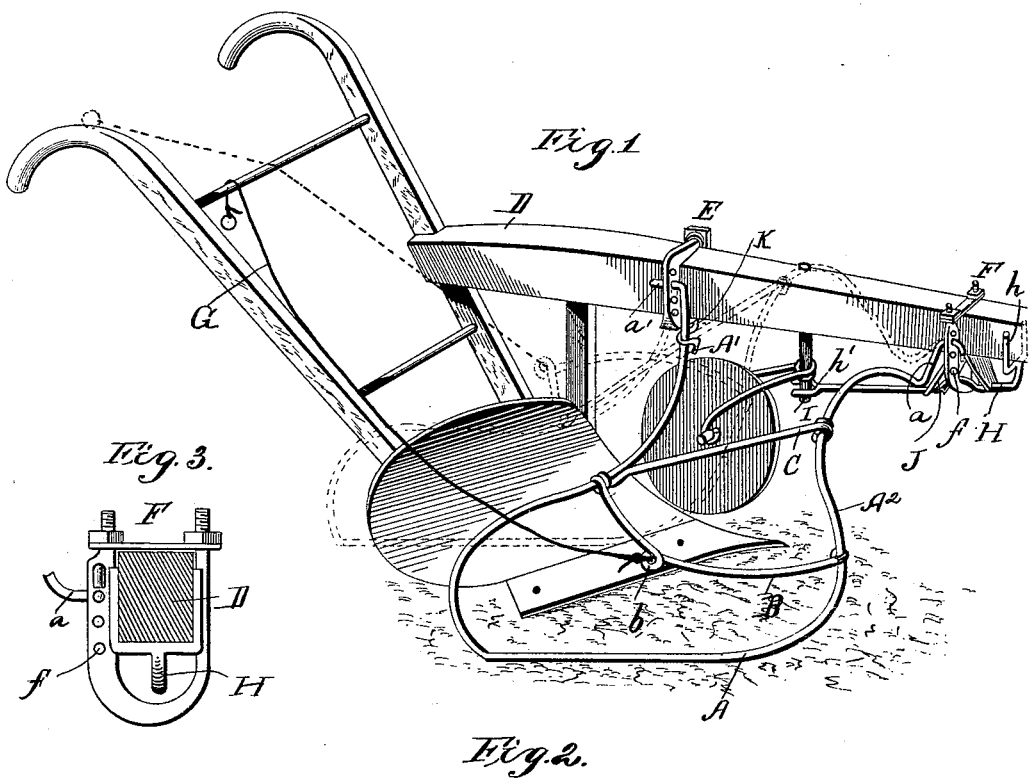
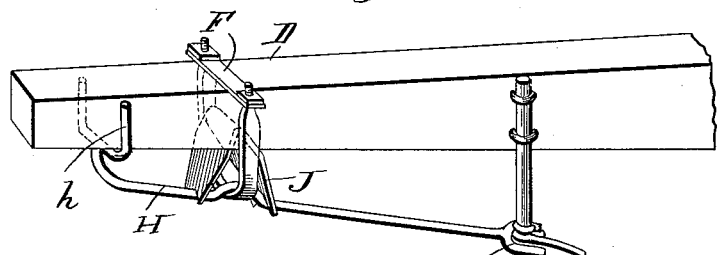
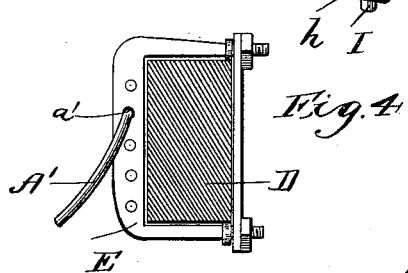
Witnesses
R. C. Laurie
C. S. Cotton
Inventor
John T. Webb
By his Attorneys
R. S. & A. P. Lacey

UNITED STATES PATENT OFFICE.

JOHN THOMAS WEBB, OF ALTON, ILLINOIS.

WEED-TURNER.

SPECIFICATION forming part of Letters Patent No. 366,543, dated July 12, 1887.

Application filed May 21, 1887. Serial No. 238,956. (No model.)

*To all whom it may concern:*

Be it known that I, JOHN THOMAS WEBB, a citizen of the United States, residing at Alton, in the county of Madison and State of Illinois, have invented certain new and useful Improvements in Weed-Turners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a weed-turning attachment for plows, and has for its object to provide simple, convenient, and efficient means for turning the weeds in a convenient and practical and advantageous manner.

The improvements consist in the peculiar and novel construction and combination of the parts, which will be more fully hereinafter set forth and claimed, and shown in the annexed drawings, in which—

Figure 1 is a perspective view of a plow embodying my invention, showing the weed-turner thrown up by dotted lines; Fig. 2, a detail perspective view of the device for turning the weeds from the colter-shank; Fig. 3, a detail cross section on the line X X of Fig. 1; Fig. 4, a detail cross-section on the line Y Y of Fig. 1.

The plow, which may be of any desired pattern, is simply shown as a means for illustrating the application of my invention. The weed-turner, composed of a single rod or wire, A, having its ends bent up and curved inwardly, substantially as shown, forming the arms $A'$ and $A^2$ and the braces B and C, is connected with the plow-beam D by the clips E and F, which embrace the beam and are suitably secured thereto, so as to be readily removed and quickly adjusted. The end $a$ of the arm $A^2$ is hook shaped, and is adapted to be thrust through one of a series of openings, $f$, in the clip F, and the end $a'$ of the arm $A'$ projects rearwardly, and is designed to pass through one of a series of openings, $e$, in the clip E. By this means the weed-turner is adjustably connected with the plow-beam and can be readily attached or detached by compressing the arms $A'$ $A^2$, which disengage the end $a'$ from the clip, and by swinging the device around the hook $a'$ can be readily disengaged from the clip F, as will be easily comprehended.

The braces B and C not only stay and strengthen the arms $A'$ and $A^2$, but are also curved so as to turn down the weeds, and the brace is provided with the eye $b$, for connecting the end of the rod or cord G therewith, which extends back within convenient reach of the device, so a pull thereon will elevate the weed-turner when tilting the plow or to avoid a root, stump, or stone.

The rod fender-bar H is bifurcated at each end, and is notched upward near its front end to fit over the clip F. The arms $h$ of the front end are extended upward and embrace the sides of the beams, and the arms $h'$ of the rear end embrace the end of the colter-shank I. The strut J, composed of a flat piece of metal bent V shape, and having the ends notched, is fitted between the clip, the under side of the beam, and the top of the fender-bar. The notched ends of the strut fit over the fender-bar, and the angle rests against the under side of the beam in the plane of the clip, so that as the clip is tightened the strut is forced down upon the fender-bar and bears upon the same on each side of the clip and holds the fender-bar firmly. This fender-bar is for the purpose of preventing the collection and lodgment of trash in front of the shank of the colter, and serves to guide the same under and beneath said shank, when it is caught by the colter and forced into the ground; and the inverted-V-shaped strut is a simple and convenient means for holding the fender-bar in position.

The braces B and C connect at one end with the arm $A'$ at a point about midway of the length, and the brace C is attached at its opposite end to the arm $A^2$ midway of the arched portion thereof, while the brace B connects at its opposite end with the arm $A^2$ at the lower end of the arch, as shown.

The catch K is pivoted to the under side of the beam, and is adapted to fit over one of the arms of the weed-turner to hold it while in operation.

I am aware that it is not new to construct a weed-turner of a single rod or wire of substantially the form herein shown and having its ends hinged to the beam, so it can rise and fall, and do not claim such, broadly, as my invention.

Having thus described my invention, what I claim, and desire to secure by Letters Patent, is—

1. A weed-turner composed of a single wire having its ends curved upwardly and laterally in substantially the same direction, forming irregular arms A' A², and the horizontal portion A, and the braces connected at one end with the rear arm midway its length and diverging at their opposite ends to the front arm near the lower end and middle thereof, said braces being curved, substantially as and for the purpose described.

2. The combination, with the beam and the clips having a series of openings in their vertical sides, of the weed-turner composed of a single wire having its ends curved upwardly and laterally, forming arms substantially of the form shown, and having a hook at the front end, and the rearwardly-projected arm at the rear end fitted in the openings of the clips, and the braces interposed between and connecting the arms of the lower brace, having an eye and the connection extended from the eye to within convenient reach of the driver, substantially as described.

3. The combination, with the plow-beam, the colter, and the clip, of the fender-bar bifurcated at each end and upwardly notched near its front end, which notch is fitted over the clip, and the inverted-V-shaped strut having notched ends, which ends are fitted upon the fender-bar on each side of the plane of the clip, substantially as and for the purpose described.

In testimony whereof I affix my signature in presence of two witnesses.

JOHN THOMAS WEBB.

Witnesses:
JONA. QUARTON,
G. W. CHURCHILL, Jr.